Nov. 15, 1966   H. A. BURGERT   3,285,596
SHOCK AND VIBRATION ABSORBER
Filed May 21, 1964   3 Sheets-Sheet 1

INVENTOR
HERBERT A. BURGERT

BY Dicke + Craig
ATTORNEYS

Nov. 15, 1966  H. A. BURGERT  3,285,596
SHOCK AND VIBRATION ABSORBER
Filed May 21, 1964  3 Sheets-Sheet 3

INVENTOR
HERBERT A. BURGERT

BY Dicke + Craig
ATTORNEYS

United States Patent Office 3,285,596
Patented Nov. 15, 1966

3,285,596
SHOCK AND VIBRATION ABSORBER
Herbert A. Burgert, Porza, Ticino, Switzerland, assignor to Unitechnik Aktiengesellschaft, Chur, Switzerland
Filed May 21, 1964, Ser. No. 369,221
Claims priority, application Germany, May 21, 1963, U 9,826
10 Claims. (Cl. 207—64)

The present invention relates to a shock and vibration absorber which is especially adapted for use in automobiles and provided with a cylindrical chamber which is filled with an incompressible fluid, and with a piston which is adapted to reciprocate in this chamber.

Shock absorbers of the above-mentioned type are frequently employed in automobiles especially for damping vibrations in the suspension of the car body. When the piston is moved within the cylinder of the shock absorber the incompressible fluid therein, usually oil, flows from one chamber through restricted passages and/or through valves to another chamber. Such a shock absorber itself does not possess any resilient properties, but the piston rod moving in the cylinder merely displaces a certain quantity of the fluid. Since this fluid is incompressible, the housing of the shock absorber must be provided with means which permit the oil-filled chamber of the cylinder to be enlarged. For this purpose it is conventional to provide the shock absorber with resilient or slidable wall portions. If these wall portions are slidable it is necessary to provide for them special sealing means which easily become defective.

It is an object of the present invention to provide a shock and vibration absorber which overcomes the above-mentioned disadvantages and possesses resilient properties even though its walls are entirely rigid and immovable. According to the invention this object is attained by inserting several resiliently compressible elements into the incompressible fluid which otherwise fills the chamber completely.

These compressible elements compensate the change in volume which is caused by the movement of the piston rod. Aside from the usual means for sealing the piston rod, there are no other means required for sealing any movable parts relative to the outside. The new shock absorber is therefore of a much more simple construction and more reliable in operation and has a greater length of service than the known shock absorbers.

It is, however, the most important advantage of the shock absorber according to the invention that it not only very effectively dampens vibrations, but also has resilient properties and may therefore be employed as a spring suspension element for automobiles. The shock absorber and the spring means according to the invention are therefore combined within the same housing. The spring characteristic of this shock absorber is determined by the particular properties of the resiliently compressible elements which are inserted into the incompressible fluid with which the shock absorber is filled.

A preferred feature of the invention consists in inserting resilient elements of different degrees of compressibility into the shock absorber. This permits the spring characteristic of the shock absorber to be adapted to the requirements in each particular case. For changing the spring characteristic it is therefore not necessary to make any structural changes on the shock absorber, but merely to exchange some of the compressible elements for others which are more or less resilient or to insert a larger or smaller number of these elements into the shock absorber.

The compressible elements are preferably made of a spherical shape and may consist of natural or synthetic rubber or a rubberlike plastic and they may either be solid or hollow with impermeable walls of different thicknesses and preferably filled with air or gases. Rubber or plastic are especially suitable for this purpose because of their physical characteristics. Such elements of rubber or plastic have the advantage that they will not produce any noise when hitting against the wall of the shock absorber in which they are freely suspended and moveable in the oil. Since air or gases are highly compressible, they are very suitable as a filling of hollow resilient elements for a shock absorber. These elements may further consist of porous or foamy rubber or plastic which is enclosed by an impermeable layer of rubber or plastic. Such elements are very easily produced, and by varying the size of the pores it is possible to vary the properties of the elements. It is also possible to combine several different materials in one element. An impermeable outer wall or coating on the elements prevents the entry of oil into the pores and a discharge of air or gas into the oil. If such elements should contain a larger quantity of air or gas, it is also possible to provide this in a hollow space at the inside of the porous rubber or plastic.

The resilient elements should preferably be inserted only into one of the oil-filled chambers of the shock absorber. In this manner it is possible to influence the characteristic of the shock absorber in both directions of movement, especially also if it is equipped with valves in the overflow channels. The shock absorber may, however, also be designed so that all of the resilient elements are disposed between two bottoms of a piston which are spaced from each other so that the elements are enclosed as in a cage and cannot move freely to any undesirable parts of the shock absorber.

According to another modification of the invention, the piston rod is made in the form of a hollow plunger which is closed at its outer end and provided with throttle openings at its inner end. This plunger is filled with oil and the resilient elements are freely suspended therein. This form of construction is of special importance for attaining a shock absorber with a particular characteristic, since only the volume of liquid which is displaced by the piston rod and is compensated by the compressible elements must flow through the throttle openings.

The various features and advantages of the present invention will become more clearly apparent from the following detailed description thereof which is to be read with reference to the accompanying drawings, in which—

FIGURE 2 shows a longitudinal section of a shock and vibration absorber according to a second embodiment of the invention; while

Figure 1:
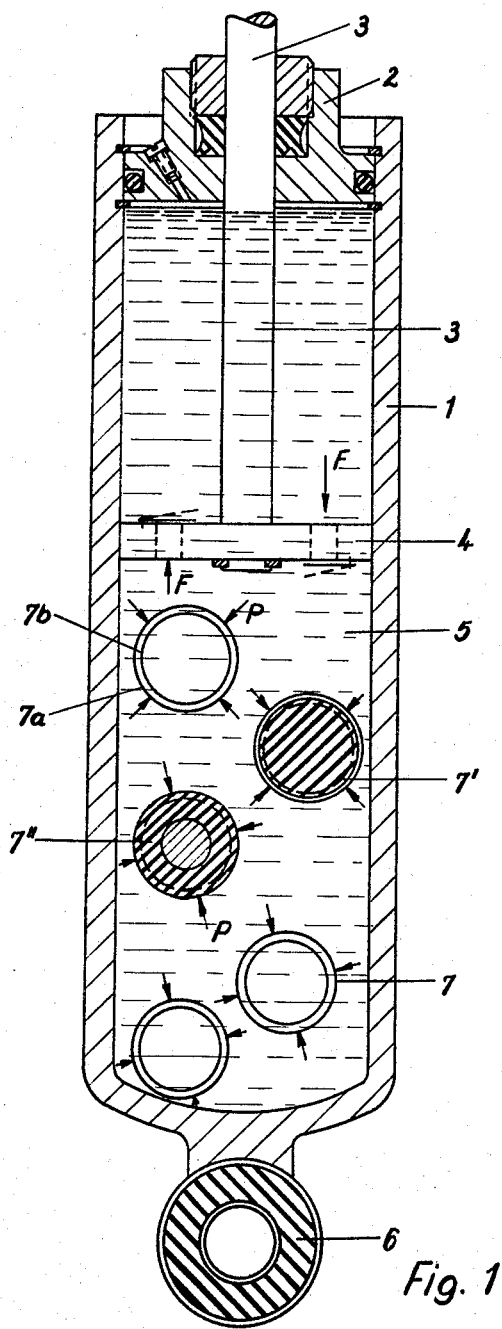
FIGURE 1 shows a longitudinal section of a shock and vibration absorber according to a first embodiment of the invention.

The shock and vibration absorber as illustrated in FIGURE 1 comprises a cylindrical housing 1 which is provided with a head 2 which is secured to one end of the housing by guard rings and is sealed to the wall thereof by a suitable packing. This head 2 is further provided with a screw for filling and venting the shock absorber. A piston rod 3 is slidable within the head 2 and it is sealed by a packing which is held in place and may be compressed by a nut which is screwed into the head 2. Piston rod 3 extends through the head 2 into the housing 1 and carries on its lower end a piston 4 which divides the inside of the housing into two chambers which are filled with a substantially incompressible fluid 5, for example, oil. On its lower end, the housing 1 is provided in the conventional manner with an eye 6 which may contain a resilient bearing element of rubber for connecting the shock absorber, for example, to a rod or bolt.

The piston 4 contains check valves which may also be in the form of throttle openings and permit a flow in the directions as indicated by the arrows F.

The chamber underneath the piston 4 contains a plurality of resilient compressible elements 7 which are preferably of a spherical shape and consist of a material which is resistant to oil and acid. When these elements 7 are fully expanded, they have a diameter as indicated by the outer circle 7a, and when they are compressed, they have a diameter as indicated by the inner circle 7b. The arrows P in FIGURE 1 indicate the pressure which acts uniformly upon the outside of the ball-shaped elements 7 from all sides.

These elements 7 may be solid and consist, for example, of a resilient body of rubber or plastic which has very small port spaces therein and is enclosed by an impermeable outer covering. This resilient body may, however, also be composed of different resilient materials. The rubber or plastic balls may also be provided with a larger central cavity, as indicated at 7″, which may be filled with air or a gas. These hollow balls should also have an impermeable outer covering.

The shock and vibration absorber according to FIGURE 1 operates as follows:

When an automobile on which the shock absorber is mounted is driven along a road, the shock absorber will, for example, be compressed. The piston rod 3 then penetrates more deeply into the cylinder and pushes the piston downwardly which thereby forces a part of the oil from the lower chamber into the upper chamber. This oil flows in the same manner as in conventional shock absorbers through throttling apertures whereby the rate of flow of the oil and thus the damping properties of the shock absorber are determined. The piston rod moving within the cylinder thus displaces a certain volume of oil. Since this cylinder is closed toward the outside, the resilient compressible balls will be reduced in volume by a certain amount. They are compressed and then exert upon the oil and thus upon the piston a certain force which depends upon the extent of their compression and the resilient properties of the different materials of which they are composed, that is, those of their outer covering, their core, and occluded gases. When the piston rod is drawn outwardly, the balls again expand accordingly.

Figure 2:
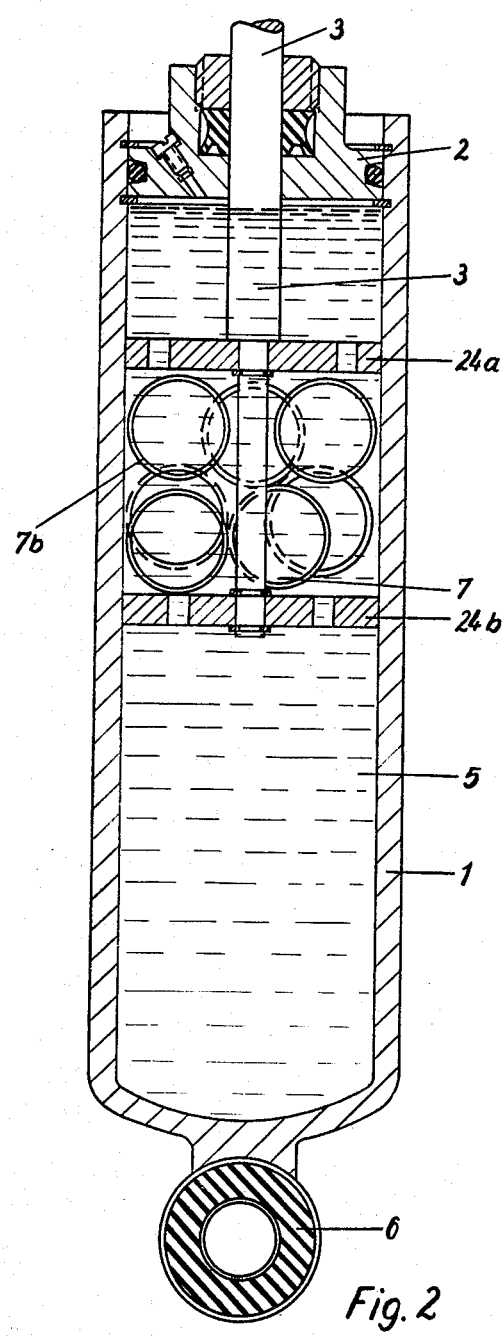

The shock absorber as illustrated in FIGURE 2 has the same construction as that according to FIGURE 1, except for the piston 4. Those parts which are alike in both shock absorbers are also identified by the same reference numerals. The piston according to FIGURE 2 consists of two piston plates 24a and 24b which are spaced at a certain distance from each other and are secured to the piston rod 3 by guard rings. These two piston plates are likewise provided with throttling apertures for the flow of oil into and out of the chamber between them. The balls 7 of rubber or plastic are disposed in this chamber between the two piston plates 24a and 24b and are held therein as in a cage. This chamber is sufficiently large to permit the balls 7 to expand and contract freely without interfering with each other. The manner of operation of this shock absorber is the same as described with reference to the shock absorber according to FIG. 1.

Figure 3:
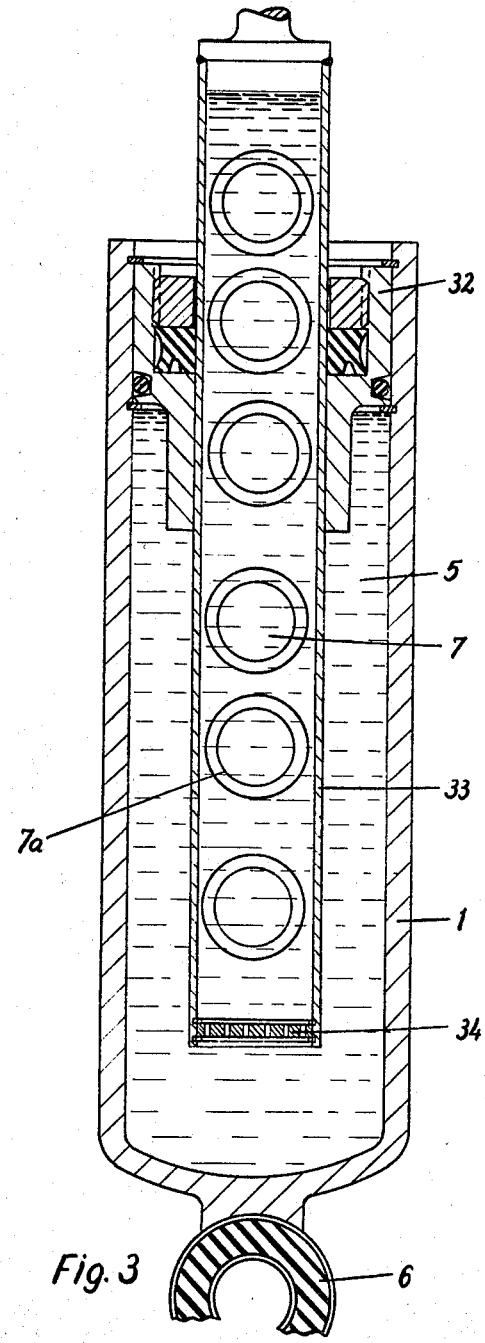
FIGURE 3 shows a longitudinal section of a shock and vibration absorber according to a third embodiment of the invention.

FIGURE 3 illustrates a shock absorber according to a further modification of the invention. Those parts which are equal to the corresponding parts of FIGURES 1 and 2 are again identified by the same numerals. The housing 1 is also of the same construction and shape as that of the shock absorbers as previously described. The pistion rod is, however, in this case designed in the form of a plunger 33 and an actual piston is omitted. The head 32 is therefore provided with a necklike extension for guiding the plunger 33. The packing structure for sealing the plunger 33 relative to the head 32 is substantially the same as that in FIGURES 1 and 2, except for its greater dimensions. Plunger 33 is tubular and its lower end is provided with an apertured disk 34 which is secured in the plunger by guard rings. The apertures in this disk 34 form throttling passages. The rubber balls 7 are in this case freely suspended within the tubular plunger 33 and they are thereby guided without any danger that they might rub along the walls of the stationary cylinder and be worn thereby.

The mode of operation of this shock absorber is again like that of the shock absorbers according to the invention as previously described, except that the volume of oil which is displaced by the plunger 33 is larger and the quantity of oil which is forced through the throttling passages is smaller than in the other shock absorbers. The dimensions of all of the shock absorbers as described affect their characteristics and they may, of course, be varied within wide limits.

In connection with the dimensions of the other parts of each shock absorber, it is also possible to vary very considerably its characteristics regarding the damping and spring action in both directions of movement by varying the resilient properties of the compressible balls as well as their number and size.

The shock and vibration absorbers according to the invention have the great advantage over those of conventional types that by combining the effects of the oil and the rubber or plastic balls they produce a shock and vibration damping effect which proceeds progressively. This improves very considerably the positive engagement of the wheels of an automobile with the road and thus the road-holding properties of the automobile.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A shock and vibration absorber for motor vehicles comprising: a closed cylinder completely filled with a substantially incompressible fluid medium, a piston element mounted for reciprocation within said cylinder, throttle means in said piston element for allowing flow of said incompressible fluid medium therethrough in a throttled manner, a plurality of resilient compressible ball-shaped elements freely movably suspended within said incompressible fluid which otherwise fills said cylinder completely, at least one of said compressible elements consisting of resilient rubberlike materials of different composition.

2. A shock and vibration absorber for motor vehicles comprising: a closed cylinder completely filled with a substantially incompressible fluid medium, a piston element mounted for reciprocation within said cylinder, throttle means in said piston element for allowing flow of said incompressible fluid medium therethrough in a throttled manner, a plurality of resilient compressible ball-shaped elements freely movably suspended within asid incompressible fluid which otherwise fills said cylinder completely, said piston element comprising a piston rod and two piston plates secured to said piston rod and spaced from each other and dividing said cylinder into a first chamber part between said piston plates and two chamber parts at both sides of said first chamber part, said compressible elements being disposed in said first chamber part, said piston plates having restricted apertures for a communication of said incompressible fluid between said first chamber part and said two other chamber patrs.

3. A shock and vibration absorber for motor vehicles comprising: a closed cylinder completely filled with a substantially incompressible fluid medium, a piston element mounted for reciprocation within said cylinder, throttle means in said piston element for allowing flow of said incompressible fluid medium therethrough in a throttled manner, a plurality of resilient compressible ball-shaped elements freely movably suspended within said incompressible fluid which otherwise fills said cylinder completely, said piston element forming a tubular plunger closed at its outer end, said compressible elements disposed within said plunger and said plunger being otherwise filled completely with said incompressible fluid.

4. A shock and vibration absorber as defined in claim 3, further comprising a member substantially closing the inner end of said plunger and having restricted apertures therein for a communication of said incompressible fluid between the inside of said plunger and said chamber.

5. A shock and vibration absorber for motor vehicles comprising,
 a closed cylinder, completely filled with a substantially incompressible fluid medium,
 a piston element mounted for reciprocation within said cylinder,
 throttle means in said piston element for allowing flow of said incompressible fluid medium therethrough in a throttled manner, and
 a plurality of resilient compressible ball-shaped elements freely movably suspended within said incompressible fluid which otherwise fills said cylinder completely,
 at least two of said compressible ball-shapel elements of substantially identical size having different values of compressibility.

6. A shock and vibration absorber for motor vehicles comprising,
 a closed cylinder completely filled with a substantially incompressible fluid medium,
 a piston element mounted for reciprocation within said cylinder,
 throttle means in said piston element for allowing flow of said incompressible fluid medium therethrough in a throttled manner, and
 a plurality of resilient compressible ball-shaped elements freely movably suspended within said incompressible fluid which otherwise fills said cylinder completely,
 at least two of said compressible ball-shaped elements of substantially identical size having different values of compressibility,
 some of said compressible ball-shaped elements having an impermeable outer wall enclosing a gas filled inner space.

7. A shock and vibration absorber for motor vehicles comprising,
 a closed cylinder completely filled with a substantially incompressible fluid medium,
 a piston element mounted for reciprocation within said cylinder,
 throttle means in said piston element for allowing flow of said incompressible fluid medium therethrough in a throttled manner, and
 a plurality of resilient compressible ball-shaped elements freely movably suspended within said incompressible fluid which otherwise fills said cylinder completely,
 at least two of said compressible ball-shaped elements of substantially identical size having different values of compressibility,
 some of said compressible ball-shaped elements having an impermeable outer wall enclosing a gas filled inner space,
 others of said compressible ball-shaped elements having a body of a porous rubberlike material and an impermeable covering of a rubber-like material enclosing said body.

8. A shock and vibration absorber as defined in claim 7, in which said body of a porous rubberlike material has a relatively large cavity at the inside thereof and a gas filling said cavity.

9. A shock and vibration absorber for motor vehicles comprising,
 a closed cylinder completely filled with a substantially incompressible fluid medium,
 piston means mounted for reciprocation within said cylinder including a piston and a piston rod connected to said piston and extending out of said cylinder through one end wall thereof,
 throttle valve means provided in said piston for allowing flow of said incompressible fluid medium through said piston from both sides thereof in a throttled manner, and
 a plurality of resilient compressible ball-shaped elements of identical size freely movably suspended on one side of said piston within said incompressible fluid,
 at least two of said compressible ball-shaped elements having different values of compressibility.

10. A shock and vibration absorber for motor vehicles comprising,
 a closed cylinder completely filled with a substantially incompressible fluid medium,
 piston means mounted for reciprocation within said cylinder including a piston and a piston rod connected to said piston and extending out of said cylinder through one end wall thereof,
 throttle valve means provided in said piston for allowing flow of said incompressible fluid medium through said piston from both sides thereof in a throttled manner, and
 a plurality of resilient compressible ball-shaped elements freely movably suspended on one side of said piston within said incompressible fluid,
 at least two of said compressible ball-shaped elements of substantially identical size having different values of compressibility.

References Cited by the Examiner

UNITED STATES PATENTS

| | | | |
|---|---|---|---|
| 2,201,912 | 5/1940 | Morgan | 188—100 |
| 2,350,989 | 6/1944 | Craig | 188—100 |
| 2,357,278 | 8/1944 | O'Connor | 188—100 |
| 2,701,583 | 2/1955 | Rux | 188—100 |
| 2,701,714 | 2/1955 | Harwood | 188—100 |
| 2,781,869 | 2/1957 | Boehm et al. | 267—64 |
| 2,788,867 | 4/1957 | Causse | 188—100 |
| 2,852,033 | 9/1958 | Orser | 138—30 |
| 2,856,035 | 10/1958 | Rohacs | 267—8 |
| 3,140,124 | 7/1964 | Heiland | 138—30 |

FOREIGN PATENTS

| | | |
|---|---|---|
| 1,113,867 | 12/1955 | France. |
| 1,114,439 | 12/1955 | France. |
| 1,187,300 | 3/1959 | France. |
| 1,050,130 | 2/1959 | Germany. |
| 1,056,956 | 5/1959 | Germany. |

ARTHUR L. LA POINT, *Primary Examiner.*

R. FIELD, R. M. WOHLFARTH, *Assistant Examiners.*